2,023,486

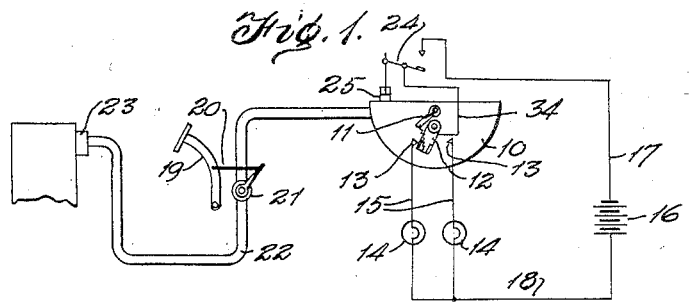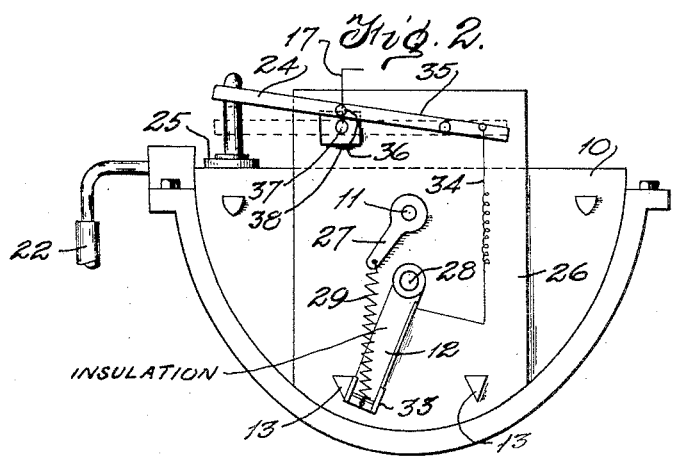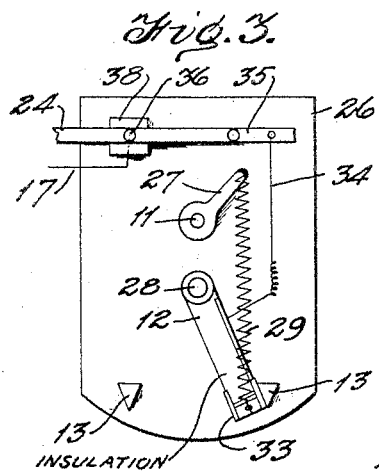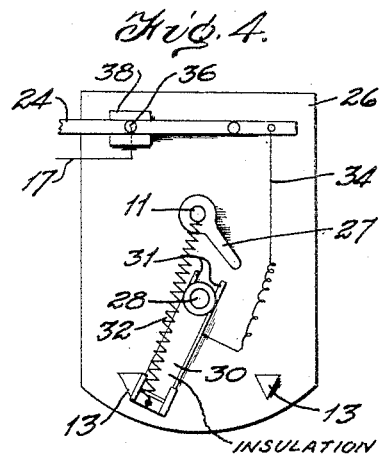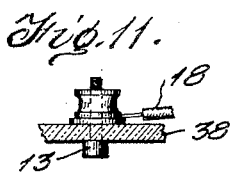

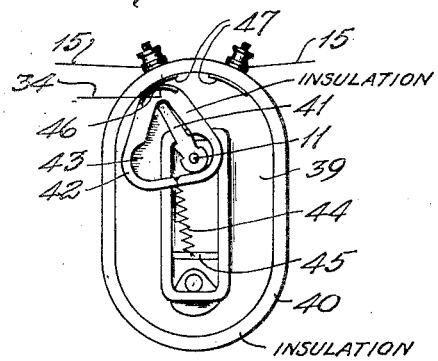
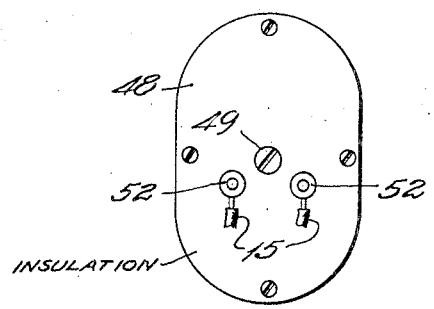
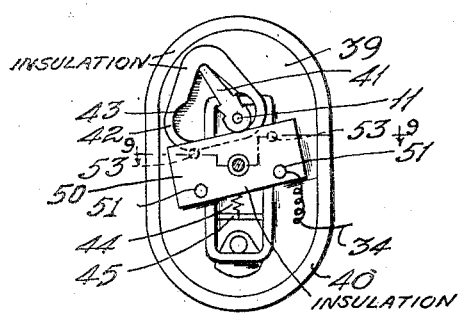
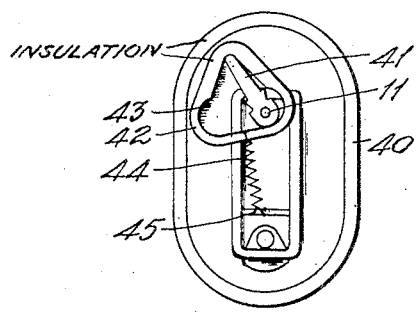
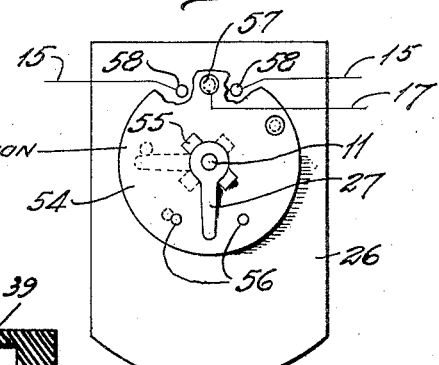
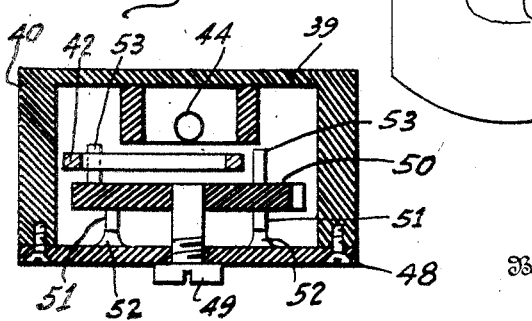
Inventor
James McComb
By
J. Kaplan
Attorney Patented Dec. 10, 1935

UNITED STATES PATENT OFFICE 2,023,486

STOP LIGHT FOR AUTOMOBILES

James McComb, Chicago, Ill.

Application February 12, 1934, Serial No. 710,942

3 Claims. (Cl. 200—83)

This invention relates to signals for automobiles and has special reference to a signalling system and circuit closing means for such a system.

One important object of the invention is to provide novel means for indicating to the operator of a following vehicle that the brakes of an automobile have been applied to check or stop the motion of such automobile, the indication being of such nature as to unmistakably attract the attention of the following operator.

A second important object of the invention is to provide a novel arrangement of vacuum motor for operating such signal upon the application of the brakes of an automobile.

A third important object of the invention is to provide novel circuit controlling means for automobile signals.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a schematic view illustrating the application.

Figure 2 is a face view of one form of the invention with the cover omitted.

Figure 3 is a detail view of one modification of the circuit changer of Figure 1.

Figure 4 is a detail view of a second modification of such circuit changer.

Figure 5 is a face view of a third modified form of circuit changer.

Figure 6 is a face view of the cover plate of a fourth modified form of circuit changer.

Figure 7 is a view similar to Figure 6 but with the cover removed.

Figure 8 is a view similar to Figure 7 but with a certain contact carrying plate removed.

Figure 9 is a section on line 9—9 of Figure 7 but showing the cover plate in place.

Figure 10 is a face view of a fifth modification of the circuit changer with the cover plate omitted.

Figure 11 is a detail section showing the manner of mounting the contacts of Figures 2, 3, and 4 on the cover plate.

As shown in Figure 1 there is provided a vacuum motor 10 of the type commonly used to operate oscillating wind shield wipers. Since all such motors include an oscillating arm and since the construction of these motors is old and well known and forms no part of the present invention, it is not deemed necessary to here illustrate or describe the motor construction other than to show the oscillating shaft 11 common to such motors and here used in the operation of the circuit changer. This shaft 11 is operatively connected, by means hereinafter described, to an oscillatory contact 12 mounted to swing between a pair of fixed contacts 13. At the rear of the automobile is mounted a pair of lamps 14, one at each side of the automobile and wires 15 connect the respective contacts and lamps. The usual automobile battery 16 is connected by a wire 17 with the contact 12 and wiring 18 connects the lamps 14 in multiple to the battery 16.

Obviously the oscillation of the contact 12 will close the circuits through the lamps in alternation so that a flickering effect will be produced at the rear of the automobile carrying such lamps and this will at once attract the attention of the operator in a following vehicle and warn him of the slowing or stopping of the preceding vehicle.

In order to produce operation of the vacuum motor 10 upon application of the brake, the brake foot lever 19 of the automobile is connected by a linkage 20 to a valve 21 located in the pipe or tube 22 which commonly connects such motors as 10 with the intake manifold 23 or other suitable source of suction. Thus, when the lever 19 is actuated to set the brakes, the valve 21 is opened and the motor 10 starts operation.

In order to prevent operation of either light unless the brakes are applied a switch 24 operated by a vacuum cylinder 25 connected to the vacuum space of the motor is preferably interposed in the wiring 17. The switch 24 is normally open but is closed when the valve is opened by operation of the lever 19.

The circuit controlling devices for this arrangement may take several forms as is shown in Figures 2 to 10. In Figures 2 and 3 there is mounted on the motor 10 a plate 26 through which projects the shaft 11 and fixed on this shaft is a rock arm 27. The contact arm 12 is swingingly mounted on a shaft or pin 28 and the free ends of the rock arm and contact arm are connected by a tension spring 29. The arm 27 swings across the center line of the shaft 11 and pin 28 so that the tension of the spring 29 snaps the arm 12 from one contact 13 to the other. The arm 27 may either extend downwardly as in Figure 2 or upwardly as in Figure 3. In the form shown in Figure 4 the arrangement is quite similar but the arm 12 is replaced by an arm 30 which engages the pin 28 adjacent to but spaced from its upper end and this upper end carries spaced pins 31 which project upwardly so as to be alternately engaged by the free end of the arm 27 as the latter oscillates. Also the spring 29 is replaced by a similar spring 32 which has its lower end connected to the free end of the arm 30 and its upper end fixed to the shaft 11. The arm 30 is thus snapped from one contact 13 to the other. In each of the forms shown in Figures 2, 3, and 4 a contact pin 33 extends transversely through the free end of the contact arm, which latter is preferably made of insulating material, and engages the contacts 13 alternately. A conductor 34 connects the pin 33 with the switch arm 35 of the switch 24 and this switch arm carries a contact 36 which is normally out of engagement with a fixed contact 37 supported on an insulating block 38 and connected by the wire 17 with the battery but, when the valve 21 is open, the contact 36 engages the contact 37 and thus places the pin 33 in connection with the battery. The insulating plate 26 supports the contacts 13 as shown in Fig. 10.

In the form of the invention shown in Figures 5 to 8 the plate 26 is replaced by a plate 39 having semi-circular ends. An insulating wall 40 extends peripherally around the plate 39. The shaft 11 extends through the center of the upper semi-circular end of this plate and carries a rock arm 41 projecting radially of the upper arc of the plate. Engaged over the shaft 11 is a triangular washer 42 having rounded angles and provided with an opening 43 of irregular but generally triangular form. The free end of the arm 41 engages in the upper angle of the opening 43 and the center of the lower side of the washer is connected by a tension spring 44 with a fixed stud 45 carried by the plate 39 below the shaft 11. By this construction the oscillation of the rock arm 41 snaps the washer 42 to one side or the other of the vertical center line of the plate 39. In the form shown in Figure 5 the upper angle of the washer 42 carries a contact 46 to which the wire 34 from the switch is connected. The contacts 13 shown in Figures 1 to 4 are replaced by contacts 47 so disposed on the inner surface of the wall 40 as to be alternately engaged by the contact 46 as it snaps between its terminal positions. The wires 15 are connected to the contacts 47.

In the form shown in Figures 6, 7, and 8 the arm and washer construction is the same as in Figure 5 but the contact arrangement is different. In this form a cover 48 supports a stud 49 and beneath the cover is an oscillatable plate 50 carrying spaced contacts 51 which are connected to the switch arm 35 in the manner shown in Figures 2 and 3 by the wire 34. These contacts project upwardly to selectively engage fixed contacts 52 carried by the cover and having connection with the wires 15. Pins 53 project from the upper corners of the plate 50 and are alternately engaged by the washer 42 as the latter is oscillated.

In the form shown in Figure 9 a circular disk 54 is mounted on the shaft 11 and is held from accidental movement by friction stops 55, the detail construction of which is not deemed necessary here to disclose as friction stops for this purpose are old and well-known. The arm 27 used in the first forms is also used here and, in its oscillations, alternately engages pins 56 projecting from the disk. A contact 57 is carried by the disk and has the wire 17 connected thereto. The contact 17 engages fixed contacts 58 on the plate 26 and these contacts have connection with the wires 15. In this form the switch 24 may be omitted since the arm 27 can be manually turned to the dotted line position so as to completely break the battery circuit.

In each of these forms there is effected a snap action which closes the circuits through the lamps alternately as the motor operates thus causing a flickering appearance in the stop lights which affords a distinctive signal immediately attracting the attention of the operator of a following vehicle.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a circuit controlling device, a motor actuated oscillating arm, a pair of spaced and fixed contacts, an oscillating washer having a triangular opening therein and mounted to oscillate about the pivot point of the oscillating arm with said oscillating arm having its free end engaging an angle of said opening, a spring snapping said washer into the extreme positions of its oscillation, and movable contact means actuated by said washer for alternately engaging said fixed contacts.

2. In a circuit controlling device, a motor actuated oscillating arm, a pair of spaced and fixed contacts, an oscillating washer having a triangular opening therein and mounted to oscillate about the pivot point of the oscillating arm with said oscillating arm having its free end engaging an angle of said opening, a spring snapping said washer into the extreme positions of its oscillation, and a contact fixed to the washer to oscillate by movement of the washer between said fixed contacts.

3. In a circuit controlling device, a motor actuated oscillating arm, a pair of spaced and fixed contacts, an oscillating washer having a triangular opening therein and mounted to oscillate about the pivot point of the oscillating arm with said oscillating arm having its free end engaging an angle of said opening, a spring snapping said washer into the extreme positions of its oscillation, an oscillatable plate having a pair of pins alternately engaged by the washer, and contact means on the plate alternately engaging said fixed contacts as the plate oscillates.

JAMES McCOMB.